United States Patent [19]

Elsbury et al.

[11] Patent Number: 5,257,641

[45] Date of Patent: Nov. 2, 1993

[54] RETROFITTABLE FIRE-STOP DEVICE

[75] Inventors: Andrew J. Elsbury, Fishers, Ind.; Paul Beckwith, Springfield, Ill.

[73] Assignee: Sentry Technologies, Inc., Anderson, Ind.

[21] Appl. No.: 927,136

[22] Filed: Aug. 7, 1992

[51] Int. Cl.⁵ .............................................. F16K 3/00
[52] U.S. Cl. ............................................ 137/79; 52/1; 52/232
[58] Field of Search ..................... 137/79; 52/1, 232

[56] References Cited

U.S. PATENT DOCUMENTS

| | | | |
|---|---|---|---|
| 4,109,423 | 8/1978 | Perrain | 52/232 X |
| 4,307,546 | 12/1981 | Dolder | 52/1 |
| 4,788,800 | 12/1988 | Whitely | 52/1 |

*Primary Examiner*—John C. Fox
*Attorney, Agent, or Firm*—Todd S. Parkhurst

[57] ABSTRACT

A retrofittable fire-stop device for use with PVC or other plastic piping is disclosed. The device includes drive means for forcing a cutting member through plastic piping in response to heat. The cutting member blocks the hole and also supports blocking means which expands within the remaining pipe to prevent fire and smoke from moving from room to room through the piping.

13 Claims, 4 Drawing Sheets

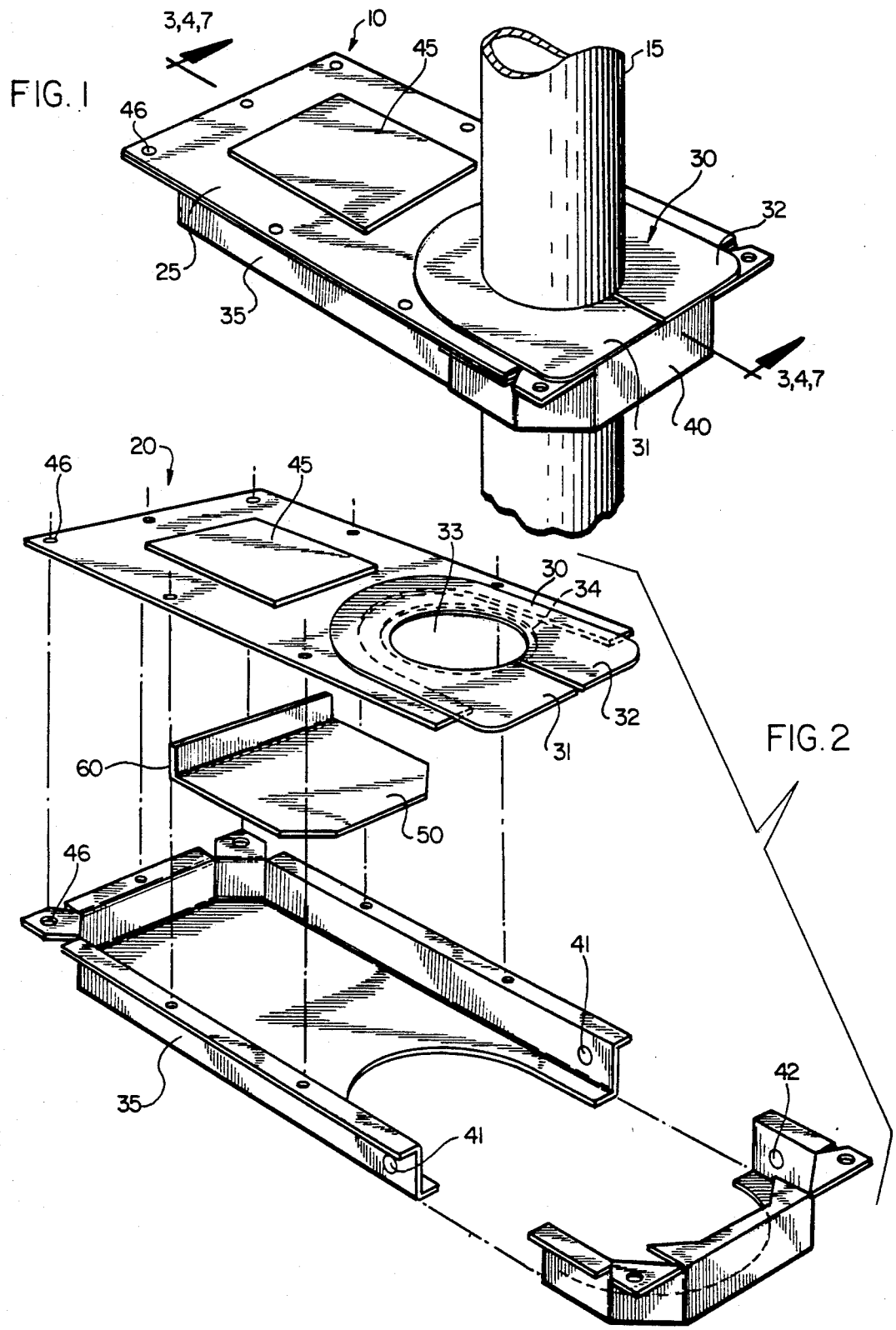

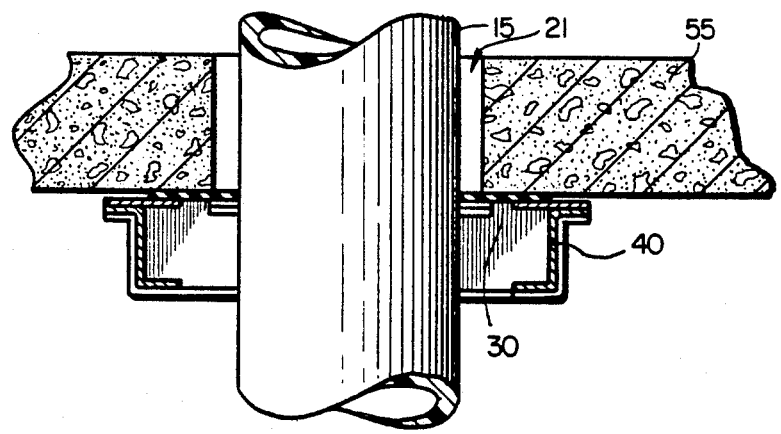
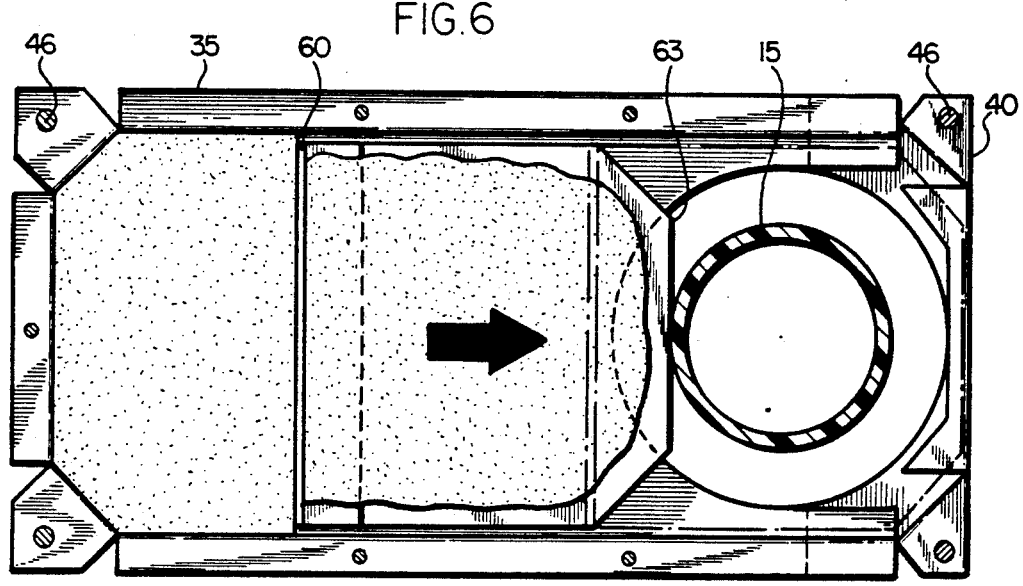
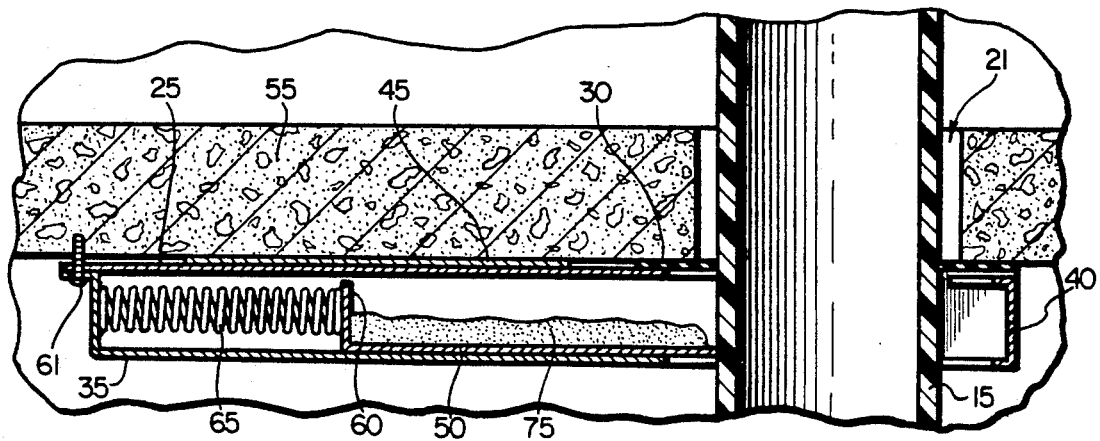

RETROFITTABLE FIRE-STOP DEVICE

FIELD OF THE INVENTION

The present invention relates generally to fire-stop devices for cutting through and sealing a plastic pipe or pipe-accepting hole in response to a fire. More particularly, the present invention relates to a retrofittable fire-stop device capable of sealing the pipe or pipe hole thereby preventing the transmission of heat, fire and smoke from room to room.

BACKGROUND OF THE INVENTION

Copper and other metals have been the primary materials used in the fabrication of pipes to be used in buildings. Advances in plastics technology, however, have resulted in the development of many new plastics, several of which are suitable for the fabrication of piping. For example, PVC, ABS and other plastic piping are now regularly used in the construction of buildings.

Although plastic piping is substantially less expensive than metal piping, plastic in general has a lower melting point than metal. In a fire, plastic pipes are therefore more likely to soften and deform or even melt.

Because pipes extend through holes in the ceilings, floors and walls of a building, if a portion of the pipe melts, the remaining portions will act like a chimney, allowing the fire to spread from floor to floor and room to room. As a result, the building codes of many cities and states require some fire separation device that will seal off the pipe in the event of a fire.

Fire-stop devices are known and have been disclosed in, for example, U.S. Pat. No. 4,788,800 (the '800 patent). The '800 patent, however, discloses a device that is an integral part of the wall or ceiling and is not a retrofittable fire-stop device that can be used in connection with an existing continuous section of pipe. Moreover, the device disclosed in the '800 patent requires the use of a fugitive metal coupling that joins two discrete pipes. Because such devices use a coupling, they are not retrofittable and cannot be easily modified to allow use with different diameter pipes Another problem with known fire-stop devices is that the devices require the pipe or coupling to melt rather substantially before the fire-stop device will operate.

Accordingly, it is an object of the present invention to provide a fire-stop device that can be installed in connection with a pre-existing installation of a single continuous length of plastic pipe as well as installed in a new building construction.

It is another object of the present invention to provide a retrofittable fire-stop device that can be quickly and easily modified to be used in connection with several different diameters of plastic pipe.

Another object of the present invention is to provide a retrofittable fire-stop device that affirmatively cuts the plastic pipe in response to a fire and thereby seals the hole (in contrast to other known devices which require the pipe to melt rather completely before attempting to seal the hole).

Yet another object of the present invention is to provide a retrofittable fire-stop device in which the device only exerts a force on the pipe when the device is exposed to flame or heat.

Another object of the present invention is to provide a retrofittable fire-stop device in which a cutting member and other fire blocking means are not in contact with the pipe until the device is exposed to heat.

A further object of the present invention is to provide a retrofittable fire-stop device in which a cutting member cuts through the pipe, delivers fire-blocking material to the interior of the exposed pipe, and provides a support against which the fire-blocking material may expand and, in combination with the cutting member, block the mating pipe hole.

Other objects and advantages of the invention will become apparent upon reading the following detailed description of the invention and upon reference to the drawings. Throughout the drawings, like reference numbers refer to like parts.

SUMMARY OF THE INVENTION

The present invention relates to a retrofittable fire-stop device for use in connection with PVC, ABS or other plastic pipes. The device comprises a housing, drive means, blocking means and a cutting member. The drive means is responsive to heat thereby forcing the cutting member through the plastic piping. The cutting member remains extended across the opening and blocking means expands against the cutting member to fill the hole created by cutting the pipe. The combination of the cutting member and the blocking means prevents fire and smoke from travelling through the hole in the pipe.

DESCRIPTION OF THE DRAWINGS

FIG. 1 is a perspective view of an embodiment of the fire-stop device of the present invention.

FIG. 2 is an exploded view showing parts of the invention in further detail.

FIG. 5 is a sectional view of an embodiment of the present invention taken substantially in the plane of line 5—5 of FIG. 3.

FIG. 6 is a sectional view of an embodiment of the present invention taken substantially in the plane of line 6—6 of FIG. 3.

FIG. 7 is a sectional view of an embodiment of the present invention taken substantially in the plane of line 7—7 of FIG. 1, including a mechanical spring drive means.

DETAILED DESCRIPTION OF THE INVENTION

Figure 3:
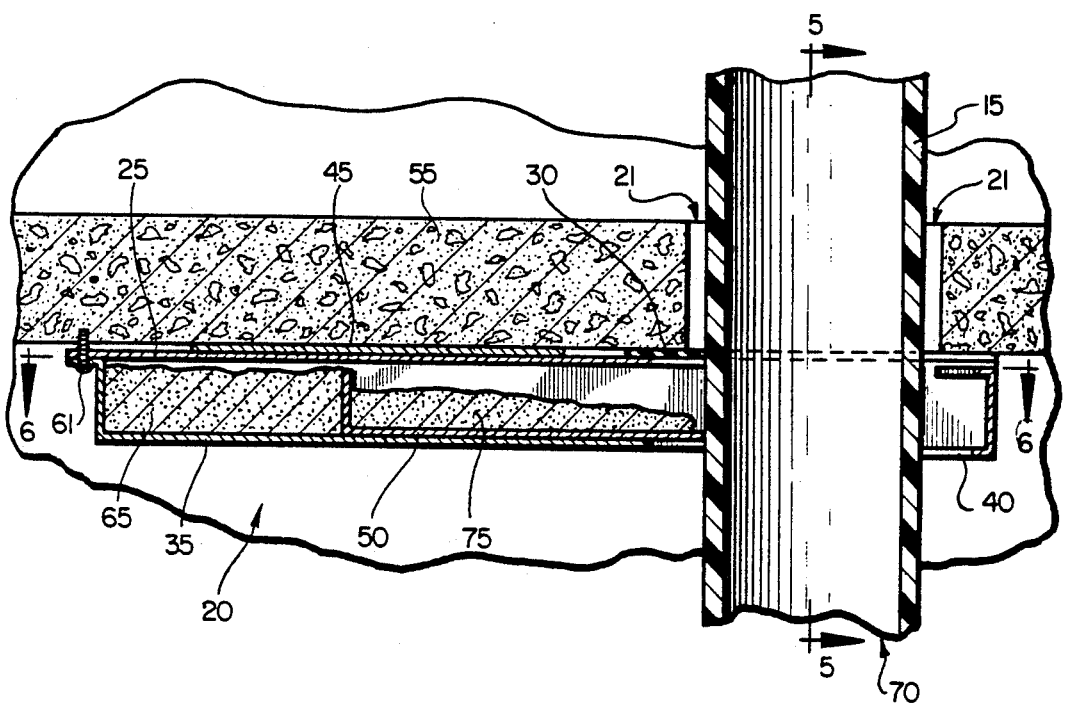
FIG. 3 is a sectional view of an embodiment of the present invention taken substantially in the plane of line 3—3 of FIG. 1.

While the invention will be described in connection with a preferred embodiment and procedure, it will be understood that it is not intended to limit the invention to this embodiment or procedure. To the contrary, it is intended to cover all alternatives, modifications and equivalents within the spirit and scope of the invention.

As shown in FIG. 1, the preferred embodiment of the retrofittable fire-stop device 10 is attached around an existing plastic pipe 15. Referring to FIG. 2, a fire-stop device housing 20 preferably includes a mounting cover 25, a larger housing member 35, a smaller housing member 40, and an adhesive member 45. Slidably mounted within the housing 20 is a cutting member 50 for cutting through the existing plastic pipe. The dimensions of the larger housing member 35 and the smaller housing member 40 are preferably small enough to permit the device to be installed in areas with space limitations. Thus, in accordance with the present invention, the device can be installed, for example, on a support structure inside a hollow wall, and can be installed in areas where other obstructions are present.

In accordance with the invention, the annular collar 30 in combination with other features of the fire-stop device permit the device to be used in connection with pre-installed continuous lengths of pipe. The retrofittable fire-stop device is fitted with an annular collar 30 preferably made from an elastic material so that when the collar 30 is deformed from its original shape and subsequently released, it will return to the original shape. To install the fire-stop device around a length of pipe, tab 31 on the annular collar 30 is bent in one direction while tab 32 is bent in the opposite direction to form an opening The collar 30 is then placed around the existing pipe 15 Once the pipe 15 is placed within the circular opening 33, the tabs 31, 32 are released and the elasticity of the annular collar 30 causes the collar 30 to return to its original shape.

The collar 30 fits snugly around the existing pipe 15 and prevents cold smoke (smoke that is not hot enough to activate the device) from travelling from room to room through the space 2 between the pipe 15 and the ceiling 55. In a related aspect of the invention, the annular collar 30 is designed and selected so that the device 10 can be used with different diameter pipes. The elasticity of the annular collar 30 is such that the opening 33 will yield to several different sizes of pipe 15. Alternatively, as shown in FIG. 2, the collar 30 can be made with annular perforations 34 such that annular sections of the collar 30 forming the opening 33 can be removed to allow the collar 30 to accommodate larger diameter pipes 15.

Figure 8:
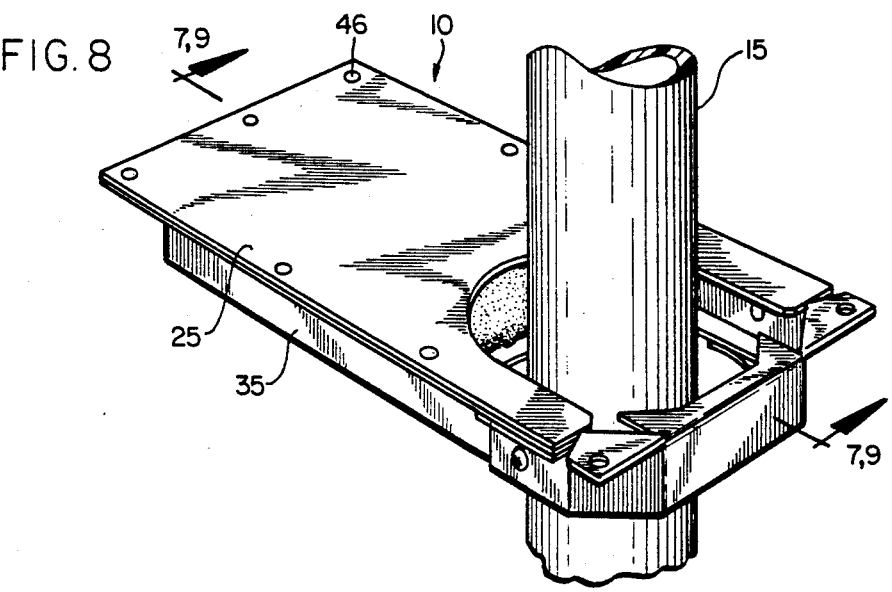
FIG. 8 is a perspective view of an embodiment of the fire-stop device of the present invention.

Although an embodiment of the present invention includes an annular collar 30, it can be appreciated that the retrofittable fire-stop device of the present invention may be used without an annular collar 30. Referring to FIG. 8, it can be seen that the individual installing the fire-stop device will seal the space 21 with caulk 23 or other suitable material that will conform to the shape of the space 21 surrounding the pipe 15 to thereby prevent the flow of cold smoke from room to room. This embodiment can also be used with several different sizes of pipe 15.

As shown in FIG. 3, the preferred embodiment of the present invention includes an adhesive member 45 fixed to the mounting cover 25. The adhesive member 45 is comprised of an adhesive material so that it sticks to the ceiling 55 thereby holding the mounting cover firmly in place against the ceiling 55 at least temporarily. If desired, fasteners 61 may be extended into the concrete ceiling or wall 55 to enhance the rigidity and security of the final installation. It should be understood that the present invention also encompasses retrofittable fire-stop devices without the adhesive member 45 fixed to the mounting cover 25, as shown in FIG. 8. In such a fire-stop device, the individual installing the housing 20 must hold the housing in place against the wall or ceiling 55 while installing fasteners 61 to fasten the assembly to the ceiling or wall 55.

To install the retrofittable fire-stop device, the larger housing member 35 is placed on a side of the pipe 15 and the smaller housing member 40 is placed on the opposing side of the pipe 15 and slideably engaged with the larger housing member 35. In the preferred embodiment the larger housing member includes retaining nodes 41. The smaller housing member 40 includes retaining detents 42 in which the retaining nodes 41 are secured to hold the smaller housing member 40 securely in place. The larger housing member 35 and mounting cover 25 are secured to the ceiling 55 with fastening members 61 that are inserted through holes 46, which are located along the periphery of the mounting cover 25 and the larger housing member 35. The fastening members 61 may be screws or other suitable fastening means. Fastening members are also placed through holes located along the periphery of the smaller housing member 40 to securely fasten the smaller housing member 40 to the ceiling 55.

Referring to FIG. 3, the cutting member 50 is slidably installed within the housing 20 and is shown in the retracted position. An upward portion 60 of the cutting member 50 extends perpendicularly to the plane formed by the ceiling 55. The upward portion 60 substantially divides the interior of the housing into two separate regions, each region containing one of the driving means or the blocking means. A preferred embodiment is shown in FIG. 6 in which the driving means 65 is comprised of intumescent material that expands in response to heat, thereby pushing against the upward portion 60 of the cutting member 50 and forcing the cutting member 50 to cut through the pipe 15. A second quantity of intumescent blocking material 75 is located on the portion of the cutting member 50 that is parallel to the plane formed by the ceiling 55.

Referring to FIG. 7, an alternative embodiment is shown in which the drive means 65' comprises a mechanical spring. In the alternative embodiment, the drive means 65' exerts a force that is sufficient to drive the cutting member 50 through the plastic pipe 15 once the pipe has softened as a result of being exposed to heat. Intumescent blocking material 75 is located on the portion of the cutting member 50 that is parallel to the plane formed by the ceiling 55. In all other respects this embodiment of the retrofittable fire-stop device is the same as is described for the invention using the intumescent drive means 65.

Figure 9:
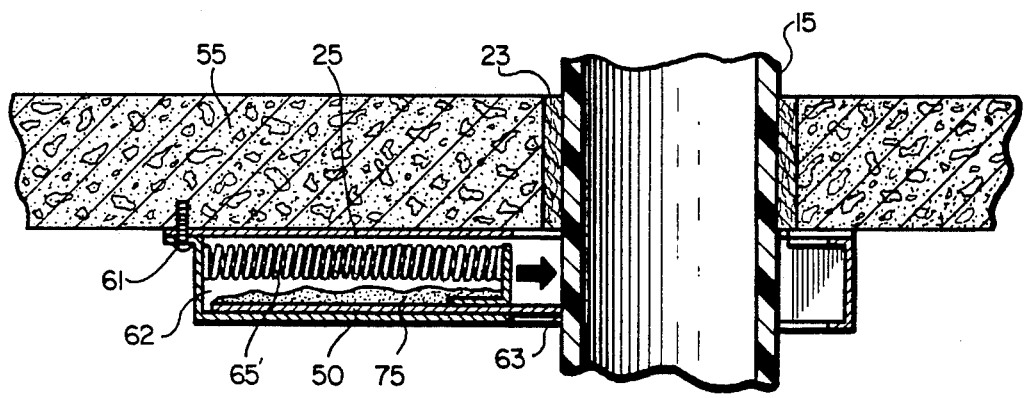
FIG. 9 is a sectional view of an embodiment of the present invention taken substantially in the plane of line 9—9 of FIG. 8, including a mechanical spring drive means.

Referring to FIG. 9, an alternative embodiment is shown in which the drive means 65' comprises a mechanical spring. In this embodiment, the upward portion 60 of the cutting member 50 is adjacent to the cutting edge 63 of the cutting member 50. The intumescent fire-blocking material 75 rests on and is delivered to the interior of the pipe 15 by cutting member 50. It can be seen that this embodiment allows the housing 20 to be somewhat smaller than that suggested in FIG. 7 because the drive means 65' and the intumescent fire-blocking material 75 both lie within the same compartment 62 formed by the housing walls and the upward portion 60. Thus, because of its smaller size, this embodiment can be used in locations where larger fire-stop devices would not fit.

Figure 4:
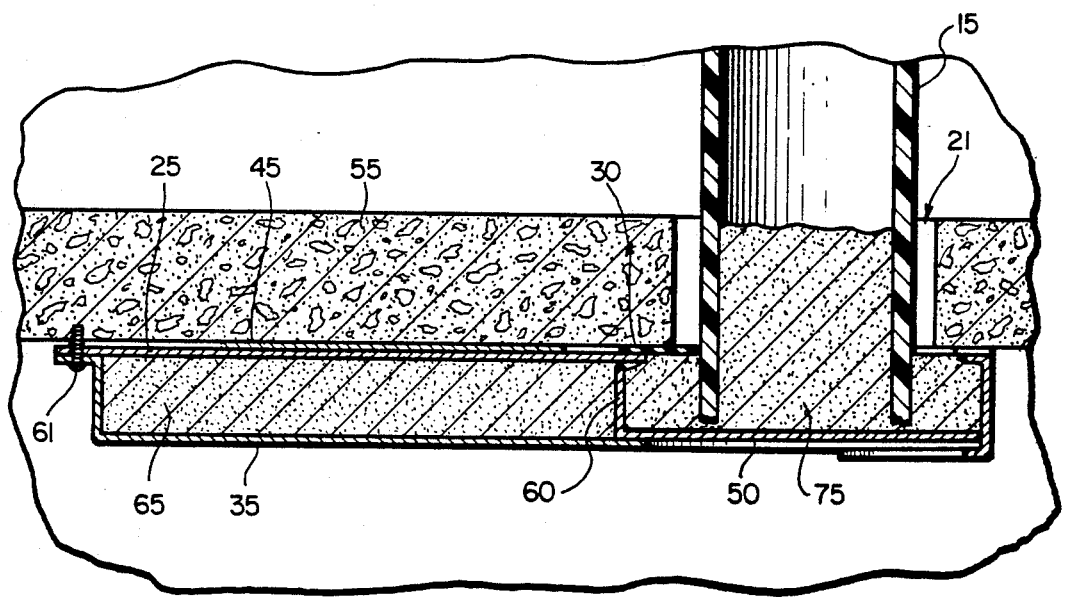
FIG. 4 is a sectional view of an embodiment of the present invention showing the cutting member in an extended position taken substantially in the plane of line 4—4 of FIG. 1.

In FIG. 4, the cutting member 50 is shown in an extended position having cut through the pipe 15. The driving material 65 has expanded in response to heat, thereby forcing the cutting member 50 to cut through the plastic pipe 15. (FIG. 4 shows an embodiment in which the drive means is intumescent material, but it should be understood that the description of the retrofittable fire-stop device of the present invention is equally applicable to the alternate embodiment in which the device includes a mechanical spring drive means). The extended cutting member 50 partially barricades the pipe opening to prevent smoke and fire from entering and travelling within the pipe 15. The cutting member 50 also delivers the intumescent blocking material 75 to a location within the pipe opening 70. The blocking material 75 then expands against the cutting member in response to the heat and, in combination with the cutting member 50, seals the pipe opening 70 to prevent the transfer of fire and smoke through the pipe 15.

Figure 10:
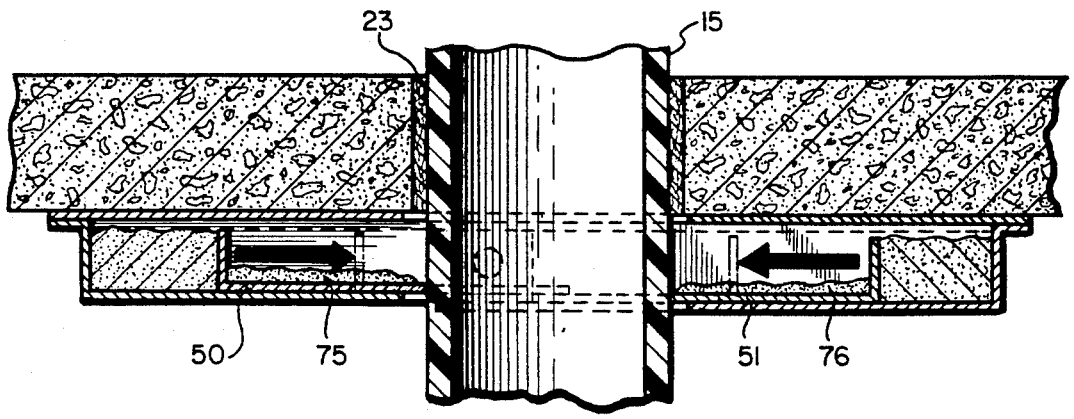
FIG. 10 is a sectional view of an embodiment of the fire-stop device of the present invention whereby the housing is comprised of two larger housing members.

The foregoing embodiments of the present invention have been described with reference to a single cutting member 50 enclosed within the housing 20. However, it should be understood that the present invention encompasses fire-stop devices that include a housing comprised of two of the larger housing members 35 that can be slidably engaged with one another, as is generally shown in FIG. 10. This embodiment of the fire-stop device functions with a cutting means comprised of two cutting members 50, 51. The cutting members 50, 51 extend from opposing sides of the pipe 15 generally in the direction of the arrows shown in FIG. 10, and thereby cut through the pipe 15. Intumescent blocking material 75, 76 is attached to the cutting members 50, 51 respectively. As the cutting members 50, 51 drive through the pipe 15, heat causes the intumescent blocking material 75, 76 to expand and seal the exposed hole in the pipe 15, thereby blocking fire from entering the exposed hole.

Intumescent material suitable for us in the present invention is commercially available under the trademark Pensil 500 Intumescent Putty from G.E. Silicones, Waterford, N.Y. 12188.

What is claimed is:

1. A retrofittable fire-stop device, comprising:
   a housing;
   the housing means comprising a first housing member and a second housing member adapted to engage the first housing member, so as to together surround a pipe;
   cutting means slidably mounted within said housing for cutting through a pipe;
   drive means associated with said housing and said cutting means for driving said cutting means through a pipe in response to heat; and
   blocking means separated from said drive means and carried by said cutting means into a position for blocking the opening in the pipe created by said cutting means.

2. A retrofittable fire-stop device according to claim 1, wherein the drive means comprises intumescent material.

3. A retrofittable fire-stop device according to claim 1, wherein the drive means comprises a spring.

4. A retrofittable fire-stop device according to claim 2, further comprising sealing means for sealing the intumescent material from the surrounding environment.

5. A retrofittable fire-stop device according to claim 2, wherein said cutting means contacts the plastic pipe only upon activation of said drive means.

6. A retrofittable fire-stop device according to claim 1, wherein said housing further comprises:
   a larger housing member; and
   a smaller housing member engaged with said larger housing member;
   wherein said larger housing member comprises retaining detents; and
   wherein said smaller housing member comprises retaining nodes that engage said retaining detents.

7. A retrofittable fire-stop device according to claim 6 wherein said housing further comprises:
   a mounting cover attached to said larger housing member; and
   adhesive means fixed to said mounting cover for securing said mounting cover to a ceiling or wall.

8. A retrofittable fire-stop device according to claim 7 wherein said mounting cover further comprises an annular collar.

9. A retrofittable fire-stop device according to claim 1, wherein said cutting means further comprises at least two cutting members on opposing sides of said pipe.

10. A retrofittable fire-stop device, comprising:
    a housing;
    the housing means comprising a first housing member and a second housing member adapted to engage the first housing member so as to together surround a plastic pipe;
    cutting means slidably mounted within said housing for cutting through the plastic pipe;
    drive means for driving said cutting means into contact with and through said pipe; and
    blocking means mounted on said cutting means at a position apart from said drive means and translatably movable by the cutting means into a position for blocking the interior of said pipe.

11. A retrofittable fire-stop device according to claim 10, wherein said driving means comprises a mechanical spring.

12. A retrofittable fire-stop device according to claim 10, wherein said driving means comprises intumescent material responsive to heat.

13. A retrofittable fire-stop device according to claim 12, wherein said cutting means contacts said pipe upon activation of said drive means.

* * * * *